(No Model.)
R. MESSENGER.
MILK TESTER.
No. 472,382. Patented Apr. 5, 1892.
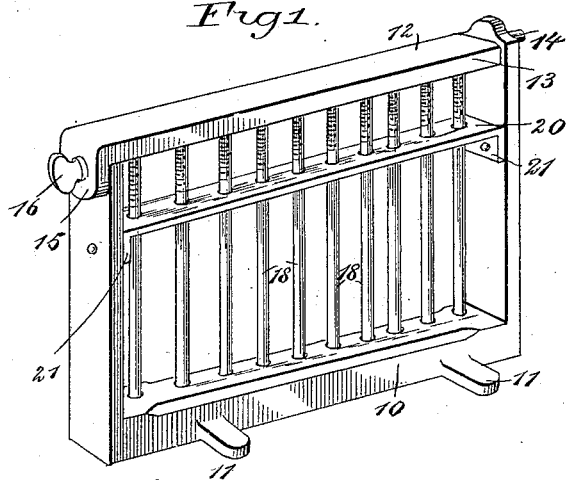
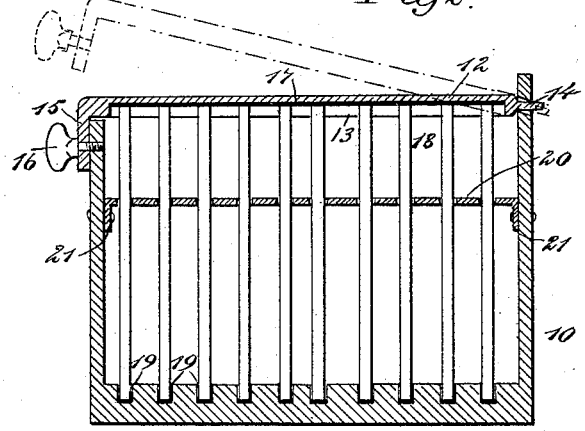
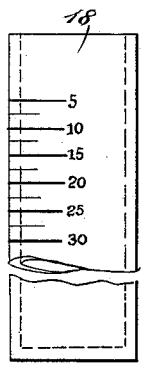
WITNESSES:
Paul Johot
C. Sedgwick
INVENTOR
R. Messenger
BY Munn & Co
ATTORNEYS.

UNITED STATES PATENT OFFICE.

RALPH MESSENGER, OF UNADILLA, NEW YORK.

MILK-TESTER.

SPECIFICATION forming part of Letters Patent No. 472,382, dated April 5, 1892.

Application filed October 5, 1891. Serial No. 407,732. (No model.)

*To all whom it may concern:*

Be it known that I, RALPH MESSENGER, of Unadilla, in the county of Otsego and State of New York, have invented a new and Improved Milk-Tester, of which the following is a full, clear, and exact description.

My invention relates to improvements in devices for testing the quality of milk. It is a well-ascertained fact that many cows will not pay for their keeping owing to the poor quality of their milk, and as it is quite a serious undertaking to find out the relative qualities of various cows' milk in a dairy under existing methods a farmer will sometimes keep an unprofitable animal for a long time.

To this end my invention consists in a milk-tester constructed substantially as is hereinafter described and claimed.

Reference is to be had to the accompanying drawings, forming a part of this specification, in which similar figures of reference indicate corresponding parts in all the views.

Figure 1 is a perspective view of the milk-tester embodying my invention. Fig. 2 is a vertical longitudinal section of the same, and Fig. 3 is a broken enlarged detail view of one of the tester-tubes.

The tester is provided with a frame 10, which, as shown in the drawings, is rectangular, and is provided with feet 11, upon which it may stand, and the frame is provided at the top with a removable lid 12, having the side flanges 13, and having at one end a projecting pintle 14, which is adapted to enter loosely a recess in the upper portion of the frame 10, thus forming a simple hinge, and the opposite end of the lid terminates in a depending flange 15, which shuts down closely upon one side of the frame 10 and carries a thumb-screw 16, which projects through the flange and into the frame, and by means of which the lid is fastened in position. The lid has a packing 17, preferably of rubber, which extends throughout nearly its entire length on the under side, and this rubber packing forms a stopper and a water-tight joint for the upper ends of the glass milk-tubes 18, which tubes are arranged vertically in a parallel position in the frame 10, and with their lower ends mounted in suitably-packed recesses 19 in the base of the frame. These tubes 18 are of a similar size, and the upper ends of the tubes are provided with gage-marks, as shown in Fig. 3, so that the amount of cream which rises to the top of the tubes can be ascertained at a glance. The tubes 18 are strengthened and supported by a cross-strip 20, which has end flanges 21, adapted to fit against the sides of the frame, and by means of which the strip may be secured in the frame. When the milk of a number of cows is to be tested the milk of the several cows is placed in separate tubes, and if the test is to be quickly made the frame and tubes may be submerged in cold water, so as to cause the cream to rise quickly, otherwise the milk may be allowed to stand in any suitable place until the cream rises. After the cream has risen the gage-marks on the various tubes can be consulted and the relative quality of the milk ascertained.

It is obvious that the apparatus may be made any size, according to the size of the dairy in connection with which it is to be used, and instead of arranging the tubes in a rectangular frame, as described, the frame may be made in any desired shape.

It will be seen that to fill the tubes it is only necessary to loosen the thumb-screw and raise the lid, and by securing the lid in place it will closely seal the tubes.

Having thus described my invention, I claim as new and desire to secure by Letters Patent—

1. A tester comprising a frame open at its top, a series of test-tubes mounted removably in the frame, and a cover for the frame, the under side of which forms a water-tight closure for the open ends of the tubes, whereby the whole may be submerged, substantially as set forth.

2. A tester comprising an open-top frame having a packing in its bottom, a series of test-tubes resting on the packing, and a cover for the frame having a packing extending along its under side and forming a water-tight closure for the open ends of the tubes when the lid is closed, substantially as set forth.

3. In a tester, the vertical rectangular frame open at its sides and top, sockets in the upper face of its bottom bar, and a cover-bar 12, engaging the upper ends of the end bars and having a packing along its under face, substantially as set forth.

4. In a tester, the open rectangular frame 10, having sockets in the upper face of its bottom bar, and a transverse aperture in the upper end of one of its end bars, the top bar 12, having a reduced end 14 entering said aperture and having a depending flange 15 at its opposite end overlapping the upper end of the other end bar, a locking-screw extending through the flange into engagement with the said end bar, and a packing-groove along the under face of the said top bar, substantially as set forth.

RALPH MESSENGER.

Witnesses:
MARTIN L. SIMS,
CHARLES M. WADE.